United States Patent
Gai et al.

(10) Patent No.: US 12,503,213 B2
(45) Date of Patent: Dec. 23, 2025

(54) VEHICLE STEERING SYSTEM

(71) Applicant: Ultraflex S.p.A., Casella (IT)

(72) Inventors: Piero Gai, Busalla (IT); Marcella Gai, Busalla (IT)

( * ) Notice: Subject to any disclaimer, the term of this patent is extended or adjusted under 35 U.S.C. 154(b) by 714 days.

(21) Appl. No.: 17/819,337

(22) Filed: Aug. 12, 2022

(65) Prior Publication Data

US 2024/0051594 A1    Feb. 15, 2024

(51) Int. Cl.
*B63H 25/02*    (2006.01)

(52) U.S. Cl.
CPC ................................. *B63H 25/02* (2013.01)

(58) Field of Classification Search
CPC ..................................................... B63H 25/02
See application file for complete search history.

(56) References Cited

U.S. PATENT DOCUMENTS

| | | | |
|---|---|---|---|
| 10,040,532 B2* | 8/2018 | Shibayama | B63H 21/213 |
| 10,661,871 B2* | 5/2020 | Koyano | B63H 25/02 |
| 2005/0266743 A1* | 12/2005 | Okuyama | B63H 25/02 440/87 |
| 2023/0092515 A1* | 3/2023 | Cheon | B60W 60/0053 701/1 |
| 2024/0051594 A1* | 2/2024 | Gai | B63H 25/02 |

FOREIGN PATENT DOCUMENTS

| | | | | |
|---|---|---|---|---|
| DE | 20120542 U1 | * | 5/2002 | B62D 1/06 |
| EP | 1853476 B1 | * | 2/2009 | B62D 1/046 |
| KR | 20160058111 A | * | 5/2016 | B60Q 1/343 |

* cited by examiner

*Primary Examiner* — S. Joseph Morano
*Assistant Examiner* — Jovon E Hayes
(74) *Attorney, Agent, or Firm* — Themis Law (57) ABSTRACT

A vehicle steering system includes a control steering wheel, a transmission system, and a steering actuator, the control steering wheel being configured to generate steering signals, transmitted to the steering actuator through the transmission system. The control steering wheel is fixedly mounted and comprises a sensor system configured to detect the position of one or both of a user's hands on the grip of the control steering wheel, the generation of steering signals being performed based on the variation of the position of one or both of the hands along the grip of the control steering wheel.

10 Claims, 5 Drawing Sheets

VEHICLE STEERING SYSTEM

FIELD OF THE INVENTION

The present invention relates to a vehicle steering system, comprising a steering wheel, transmission means and steering actuator means.

The steering wheel is configured to generate steering signals, transmitted to the steering actuators through the transmission means.

What was just described is the common configuration of the steering systems known in the state of the art, applicable to any vehicle, whether it is moved on land, such as cars, or moved on other surfaces, such as boats.

In the vehicles known in the state of the art, the steering wheel is mounted rotatably with respect to a dashboard, such that the rotation of the steering wheel corresponds to an activation of the steering actuators.

With regard to cars, the rotation of the steering wheel is transmitted, through the steering column and the steering box, to the wheels, which rotate around an axis perpendicular to the road surface, so as to change the direction of the car.

A similar process occurs in boats, the rotation of the steering wheel corresponds to a translation of the cylinders of the outboard motors, which, in a manner completely corresponding to wheels, drag the outboard motors in rotation around an axis perpendicular to the water surface, so as to change the direction of the boat.

Regardless of the type of vehicle, the steering is controlled by the rotation of the steering wheel, a rotation which has some disadvantages.

In fact, the steering wheels installed on the latest generation vehicles consist of increasingly complex electronic devices, which perform different functions, which interface with the vehicle's infotainment systems and which also allow to set the vehicle's speed conditions.

As the functionality required of the steering wheel increases, the complexity of the connections to be made also increases, such as the number of connection cables between the vehicle control unit and the steering wheel.

Such a feature is particularly problematic in boats, where the steering wheel must often perform more than one full rotation to translate the steering cylinders along the entire stroke which the cylinders themselves can perform.

The high number of connection cables makes it difficult to rotate the steering wheel, as they can limit movements, with the risk of tearing or wearing out the connection cables themselves.

The systems known in the state of the art include two main solutions to such a problem.

According to a first solution, it is possible to include a greater length of the cables, so as to allow wide rotations to the steering wheel, but, precisely because of the large number of connections, the cables intertwine with each other during the rotation of the steering wheel with the risk of wear and malfunctions.

A second solution includes the use of steering wheels which limit the number of cable connections, envisaging, for example, sliding contacts which allow to obtain an electrical connection between the moving part (the steering wheel) and the fixed part (the dashboard).

However, such a configuration is more complex from a constructive point of view, with an inevitable increase in cost, as well as more prone to breakages and malfunctions, especially in a critical environment such as that of boats, subjected to wear and tear by external agents.

There is therefore a need which is not satisfied by the state of the art to make a vehicle steering system which allows to resolve the above-described disadvantages.

SUMMARY OF THE INVENTION

The present invention achieves the above objects by making a steering system as described above, in which the steering wheel is fixedly mounted and comprises a sensor system configured to detect the position of one or both hands of a user on the grip of the steering wheel.

Furthermore, the generation of the steering signals is performed on the basis of the variation of the position of one or both hands along the grip of the steering wheel.

As is evident from what has just been described, the system object of the present invention modifies the paradigm of the steering systems known in the state of the art, i.e., the steering wheel does not rotate, but the movement of the user's hands causes the generation of the steering signals.

The steering wheel within the system object of the present invention is therefore used as a support for the user's hands during driving and as a guide for the hands themselves to impart steering control signals: the user will have to move one or both hands along the grip of the steering wheel, performing a circular path, to steer the steering actuator means, without needing to rotate the steering wheel.

The control steering wheel within the system object of the present invention can therefore include all the electrical connections necessary to perform the most disparate functions, without the risk that the connection cables will wear out or be an impediment to the control of the vehicle.

The possibility of including any number of connections and the presence of a fixed steering wheel which can also be used as a support, allows to install levers, buttons or the like on the steering wheel, which perform functions aimed at controlling one or more components of the vehicle.

Starting from the generic concept above, it is possible to include different technologies which allow the position and movement of the user's hands along the grip of the steering wheel to be identified, as well as it is possible to envisage that the generation of the steering controls occurs exclusively through the movement of one hand or through the combination of the movements of both hands.

According to a first embodiment, the sensor system comprises one or more capacitive sensors placed on the steering wheel and arranged along at least part of the length of the grip of the steering wheel.

As will be described later, and as will be apparent from the illustration of some exemplary embodiments, it is possible to envisage that the sensor system includes sensors of any technology, such as capacitive sensors, optical sensors, magnetic sensors, thermal sensors, taken as an alternative to each other or in combination.

Preferably, the capacitive sensors are placed in the front and/or peripheral part of the grip of the steering wheel, facing the user, so that the user can slide the hand on the steering wheel to "mimic" the rotation of the steering wheel itself and generate the steering signals.

In any case, it is possible to envisage positioning the capacitive sensors in the part behind the steering wheel, i.e., opposite with respect to the front part, so as to be able to control the boat with only the movement of the user's fingers.

With the same installation methods, it is possible to include, as an alternative or in combination with the capacitive sensors, thermal sensors, aimed at detecting the correct positioning of the user's hands.

According to a further embodiment, the sensor system comprises a guide arranged along at least part of the length of the grip of the steering wheel, which guide cooperates with a slider, means for identifying the movement of the slider being included.

In this case the user will move the slider with his own hand, moving it along the grip of the steering wheel.

Depending on the technology used for detecting the position of the slider, different embodiments can be envisaged, both of the guide and of the slider, which will be described later, through the illustration of some example embodiments.

According to a possible variant embodiment, the slider supports a covering element of at least part of said guide: the covering element is mounted integral with the slider and has a relative movement with respect to the control steering wheel.

According to an improvement, the covering element covers the guide along the entire length and is supported by more than one sensor, preferably three.

Thereby, the user no longer needs to find the exact point of the slider with his hand, but will be free to rotate the element just like in a traditional steering wheel.

As described for the capacitive sensors, it is possible to envisage that the guide is placed on the front part of the grip of the steering wheel, facing the user.

In accordance with such a configuration, it is particularly advantageous to include an optical system for identifying the movement of the slider, as will be described later.

Also, in the event of the presence of the guide, it is possible to envisage obtaining such a guide in the thickness of the grip of the steering wheel, with the opening facing away from the front part of the steering wheel itself.

In this case, the slider can be replaced by a lever system, such that the movement of the levers is detected by special movement detection means in order to generate the steering signals for setting the steering actuators.

The slider can be made according to any of the manners known in the state of the art.

According to a possible embodiment, the slider can include a housing seat for at least part of the user's fingers and/or hand and/or hands, so that the user can drag the slider by moving one or both hands, without the need to grip the slider.

Such an embodiment is particularly advantageous in a particular field of application of the system object of the present invention.

In fact, as anticipated, the system object of the present invention can be used on different vehicles, both boats and cars, but is not limited to vehicles.

In fact, the system object of the present invention can be included in combination with a computer or a console or the like for the use of the system itself for controlling virtual vehicles, within video games, simulators or the like.

As described above, the peculiar fixed steering wheel configuration allows to include different connections also in order to be able to extend the functionality of the system object of the present invention, with respect to the systems known in the state of the art.

For example, it is possible to include a display unit configured to display at least the running conditions of the vehicle.

Such a display unit can comprise all the functions of the infotainment systems known in the state of the art, but it can also envisage communication with the sensor system included on the steering wheel so as to obtain visual feedback aimed at informing the user of the movements which are being carried out and which are identified by the sensor system.

For example, the display unit can display a virtual model of a steering wheel, which rotates based on the recorded movements of the user's hands, so that the user has instant visual feedback about the extent of steering.

For this reason, although the display unit can be located in any area of the vehicle, it is particularly advantageous to place such a unit in the centre of the control steering wheel.

Thereby, not only will the user always have the display unit before their eyes, but the virtual model of the steering wheel will be even more accurate, without the user having the feeling of a stationary steering wheel.

From what has just been described, it is evident that the presence of a processing unit aimed at processing the data detected by the sensor system is essential and which bases the generation of the steering signals on said processing.

Such a processing unit can be set so as to increase the functionality of the system object of the present invention.

For example, it is possible to envisage that the processing unit is configured to set, to a corresponding movement value of one or both of the user's hands, a corresponding movement value of the steering actuator means.

Advantageously, such a feature allows to vary the movements which the hands must make to perform a given steering radius, for example based on the running conditions of the vehicle.

For example, with the same movement of the user's hands, as the speed of the vehicle increases, it is possible to envisage a decrease in the movement of the steering actuator means.

Finally, according to a further variant embodiment, the system comprises a sensor aimed at identifying the movement of the steering actuator means.

Such a variant is particularly advantageous if the steering system is installed on board a boat, so as to identify the movement of the steering cylinders: thereby, control procedures can be envisaged so as to identify that the movement of the cylinder is in accordance with the corresponding value of the movement of the user's hands, based on the settings of the processing unit.

BRIEF DESCRIPTION OF THE DRAWINGS

These and other features and advantages of the present invention will become clearer from the following disclosure of some exemplary embodiments illustrated in the accompanying drawings in which.

It is specified that the figures attached to the present patent application show only some possible embodiments of the steering system object of the present invention to better understand its described advantages and features.

Such embodiments are therefore to be understood as purely illustrative and not limiting to the inventive concept of the present invention, namely to make a steering system which has a fixed control steering wheel, i.e., which does not rotate, but whose rotation is replaced by a detection of the movement of one or both hands of the user.

DETAILED DESCRIPTION OF EMBODIMENTS OF THE INVENTION

With particular reference to the drawings, a steering system mounted on a boat is illustrated, but it is evident from what has been described above, that the system object of the present invention is adaptable to any vehicle, without envisaging substantial changes to the essential components of the system object of the present invention.

Furthermore, the control steering wheel illustrated in the drawings attached to the present patent application is reported as a classic steering wheel, with an outer circular crown as a grip and a central hub, but it is evident how the system object of the present invention can include any grip, also made through separate parts, for example arranged on distinct circular sectors.

The essential requirement is that the steering wheel has a grip in which the sensor system can be integrated to detect the movement of one or both of the user's hands.

Figure 1:
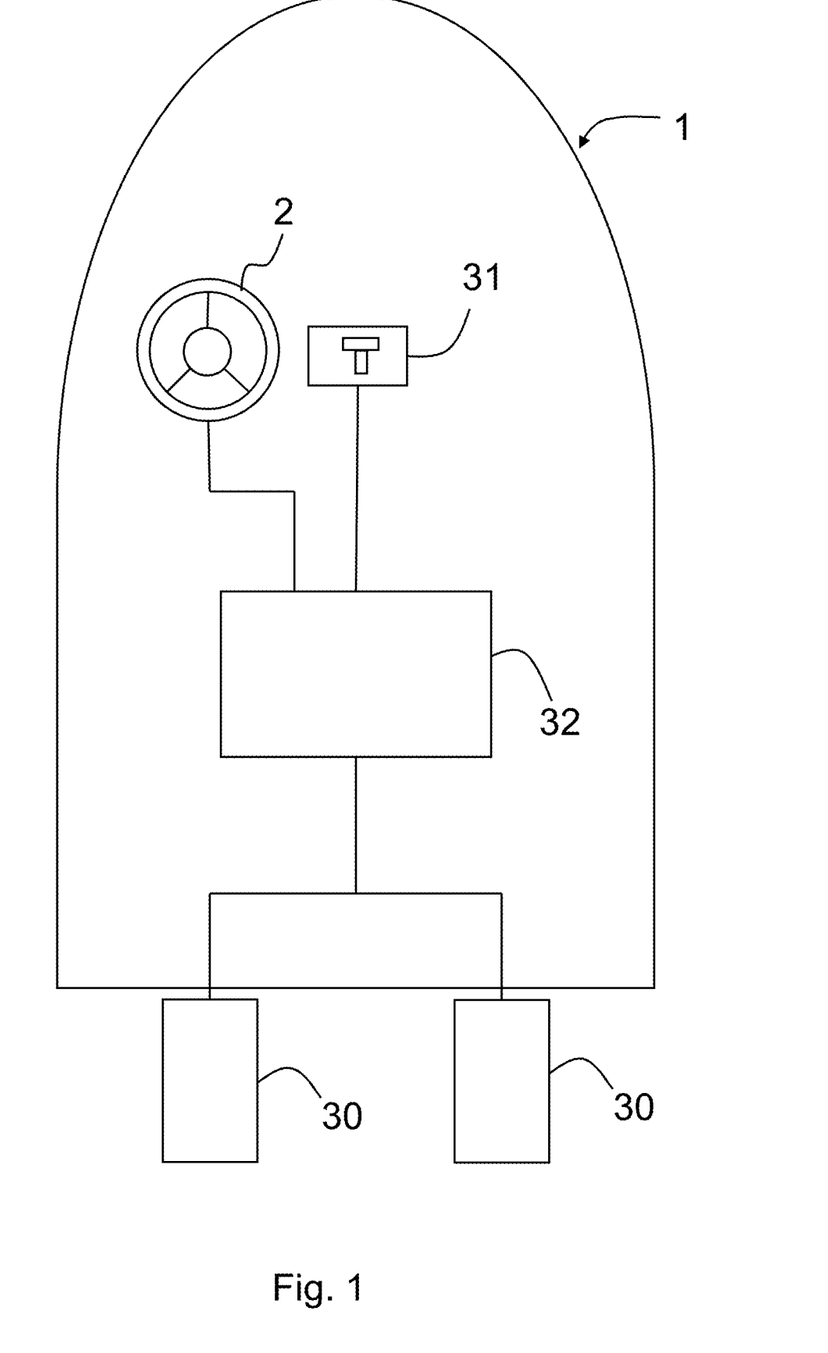
FIG. 1 illustrates an exemplary diagram in functional blocks of a possible embodiment of the system object of the present invention.

With particular reference to FIG. 1, a steering system of a boat 1 is illustrated in a basic diagram in functional blocks.

The boat 1 has two outboard motors 30, whose orientation is controlled through the generation of steering signals generated by the detection, which will be described later, performed on the steering wheel 2.

The power delivered by the motors 30 can be controlled by an acceleration/inversion lever 31.

The generation of steering signals is regulated by the processing unit 32, responsible for the orientation setting of the motors 30.

As in the systems known in the art, the output signals from the processing unit 32 are sent to the steering cylinders (not shown) connected to the outboard motors 30.

Therefore, the steering system object of the present invention has a first exclusively electronic part, since, as will be widely described, information detected by the steering wheel 2 is detected and processed by the processing unit 32.

Downstream of the processing unit 32 it is possible to include an electro-hydraulic system or an electro-mechanical system, known in the state of the art, for the activation and movement of the outboard motors 30.

Obviously, the processing unit 32 includes therein all the components necessary to control the boat 1, such as for example control and feedback sensors about the operation of the outboard motors 30, data processing units, storage units, etc.

Figure 2A:
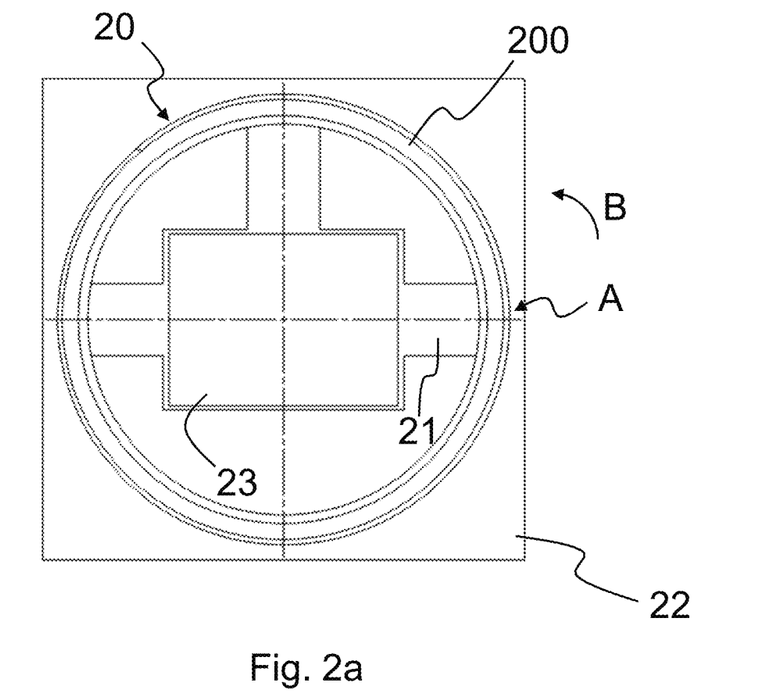
FIGS. 2a and 2b illustrate two views of a possible embodiment of the control steering wheel belonging to the system object of the present invention.
Figure 2B:
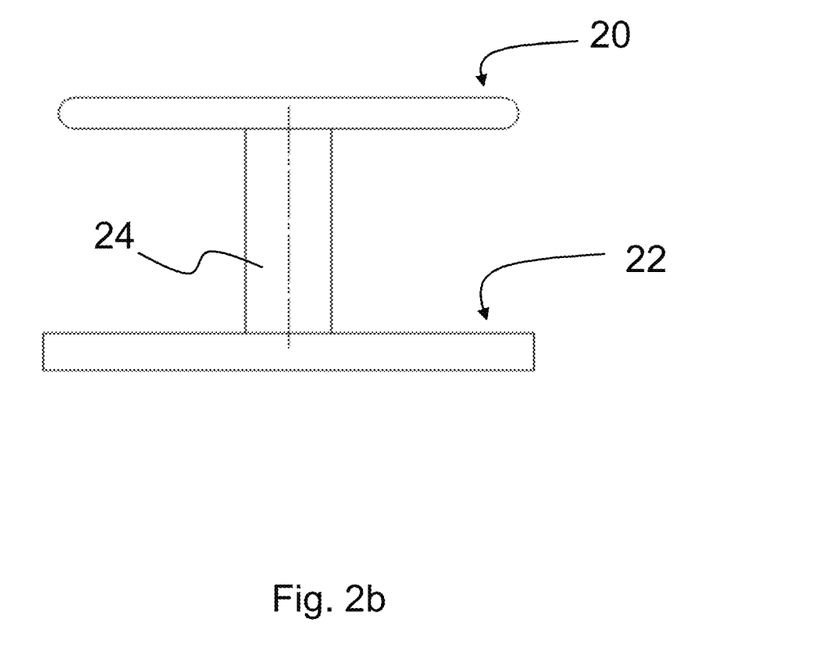

FIGS. 2a and 2b illustrate a possible embodiment of the control steering wheel belonging to the system object of the present invention, respectively according to a front view and a side view.

The steering wheel 2 comprises a circular crown 20 for gripping consisting of an annular element which has a front surface facing the direction of the user and three spokes 21 which connect the crown 20 to the central hub 23.

As in the steering wheels known in the state of the art, the three spokes 21 connect with each other at the central hub 23, so as to connect the steering wheel to a dashboard 22 through a stem 24.

As described above, the steering wheel, in particular the crown 20, the spokes 21, the hub 23 and the stem 24 are mounted fixed with respect to the dashboard 22, i.e., they do not have a relative movement with respect to the dashboard 22.

The steering and orientation setting signals of the outboard motors 30 are generated by virtue of the presence within the steering wheel 2 of a sensor system, configured to detect the movements of one or both hands of a user.

In the particular case of FIG. 2a, the sensor system consists of one or more capacitive sensors 200, arranged along the entire front surface of the crown 20.

By virtue of the presence of the sensors 200, the movement of one or both of the user's hands over the front surface of the crown 20 is detected, if the user's hand grazes or touches the capacitive sensors 200.

For example, with particular reference to FIG. 2a, it is assumed that the user places his hand in point A and drags it along the grip, in contact with the sensors 200, in the direction indicated by the arrow B.

The sensors 200 detect this movement and transmit the detected information to the processing unit 32.

The processing unit 32 translates such data into steering signals, in particular into a rightward movement, with reference to FIG. 1, of the outboard motors 30.

It follows that the movement of the user's hand in the direction of arrow B is interpreted as a rotation of the steering wheel in the direction of arrow B.

As described above, according to a possible embodiment, the control steering wheel 2 belonging to the steering system object of the present invention, includes a display unit placed at the central hub 23.

The display unit is also fixed with respect to the dashboard 22.

Figure 3A:
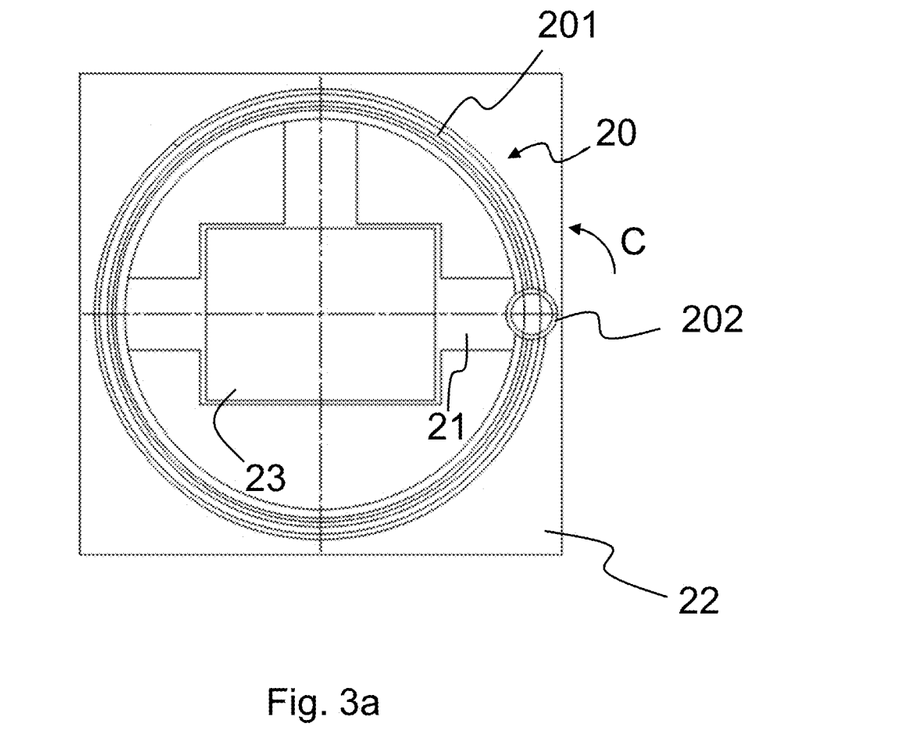
FIGS. 3a and 3b illustrate two views of a further embodiment of the control steering wheel belonging to the system object of the present invention.
Figure 3B:
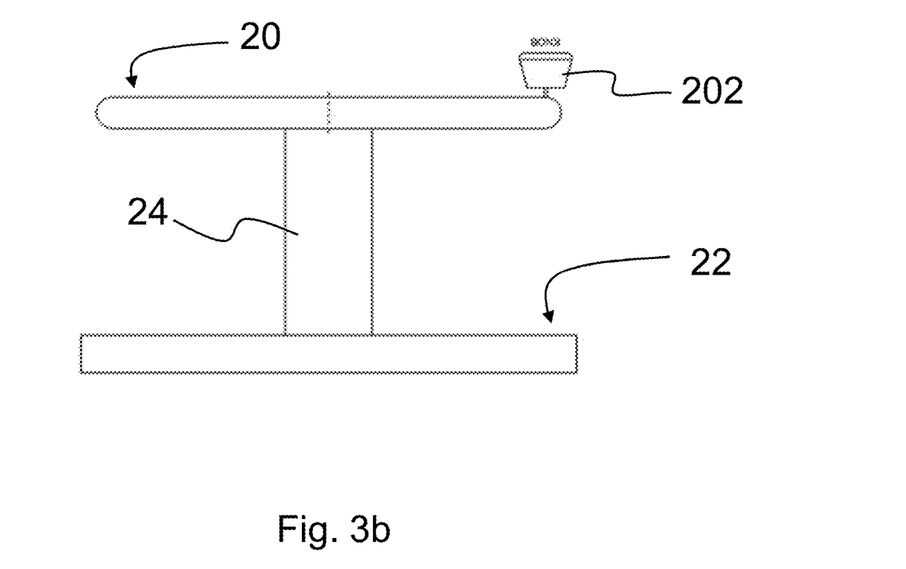

A completely similar operation can be envisaged with regard to the embodiment illustrated in FIGS. 3a and 3b. in which the steering wheel 2 has the same features as the steering wheel 2 according to FIGS. 2a and 2b, with the only difference relating to the sensor system aimed at detecting the movement of a user's hands.

In this case, in fact, the sensor system comprises a guide 201 which cooperates with a slider element 202, configured to slide along the guide 201.

In this case the sensor system also comprises means for detecting the position and movement of the slider 202.

With reference to FIG. 1, the user who therefore wants to direct the boat 1 to the left, i.e., to orient the outboard motors 30 to the right, must simply act on the slider 202 and move it in the direction of the arrow C, i.e., towards the upper part of FIG. 3a, along the guide 201.

The means for detecting the movement of the slider 202 will detect such a movement and the data will be processed by the processing unit as described above in relation to FIGS. 2a and 2b.

The guide 201 can consist of a rail obtained in the thickness of the circular crown 20, within which to slide the slider 202, according to any one of the manners known in the state of the art.

The slider 202 can consist of a pin on which to fix a knob free to rotate with respect to the pin, so as to facilitate the movement of the slider 202 if the user grips the knob.

The means for detecting the position and movement of the slider 202 can be obtained through an optical reading system.

In this case, either the guide 201 or the slider 202 can emit a light radiation which is detected by the slider 202 or the guide 201, respectively: such a detection is then transmitted to the processing unit 32.

In addition to the optical system, any technology capable of detecting the movement of the slider 202 with respect to the guide 201 can be included, e.g., magnetic, piezoelectric, or the like.

Figure 4A:
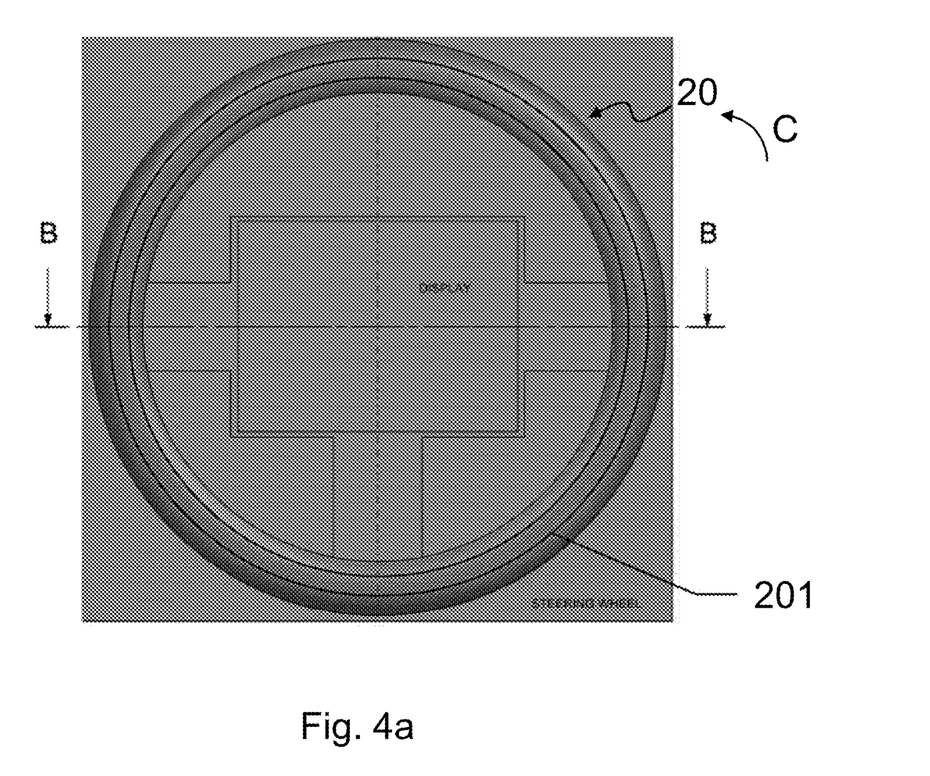
FIGS. 4a and 4b illustrate two views of a further embodiment of the control steering wheel belonging to the system object of the present invention.
Figure 4B:
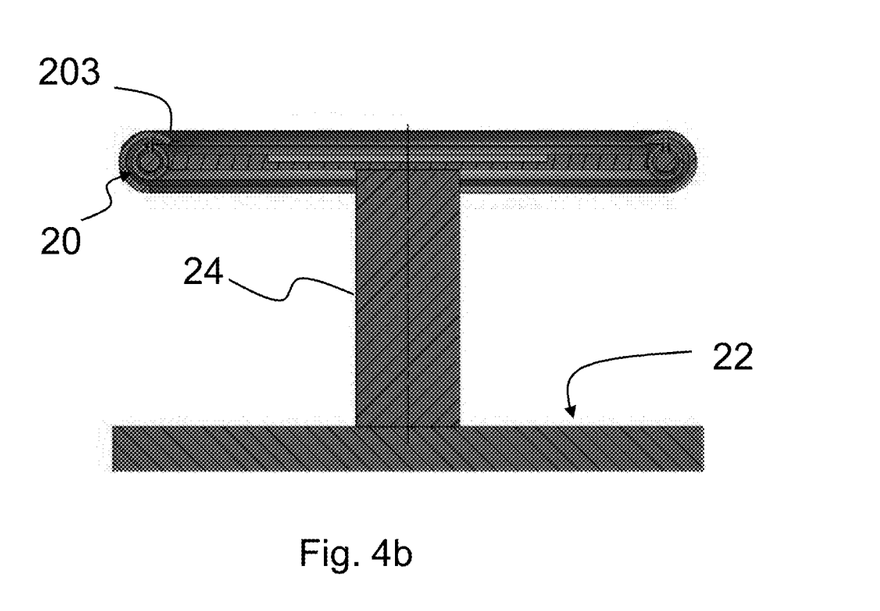

FIGS. 4a and 4b illustrate two views of a further embodiment of the steering wheel object of the present invention.

According to such an embodiment, the steering wheel is made as described in relation to FIGS. 3a and 3b, but in this case the slider is not made in the form of a handle, but envisaged between sensors, radially equidistant from each other along the entire length of the guide.

The three sliders support a covering element 203, which extends along the entire length of the guide and which fully covers the guide.

The covering element 203 is fixed, in its underlying part, i.e., in the opposite direction with respect to the user, to the three sliders, but is not in any manner connected to the rest of the circular crown 20.

It follows that the covering element 203 can be made as an annular element, aimed at exclusively covering the guide, or, as illustrated in the figures, as a sort of sleeve aimed at almost entirely covering the outer surface of the circular crown 20.

FIG. 4b illustrates a section of the steering wheel object of the present invention, precisely to illustrate the embodiment of the covering element 203 as a tubular sleeve.

Regardless of the configuration, the covering element 203 will be free to rotate according to the direction indicated by arrow C, dragging the three sliders: the covering element 203 is therefore integral with the sliders, but has a relative movement with respect to the circular crown 20.

Finally, it is specified that for the detection of the movement of the sliders, any technology can be included, as described above.

Figure 5A:
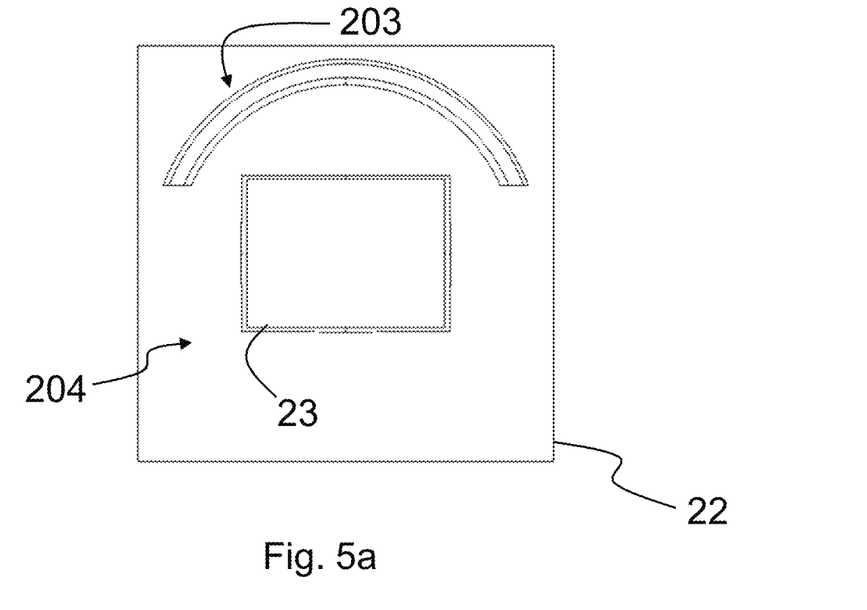
FIGS. 5a and 5b illustrate two further embodiments of the control steering wheel belonging to the system object of the present invention.
Figure 5B:
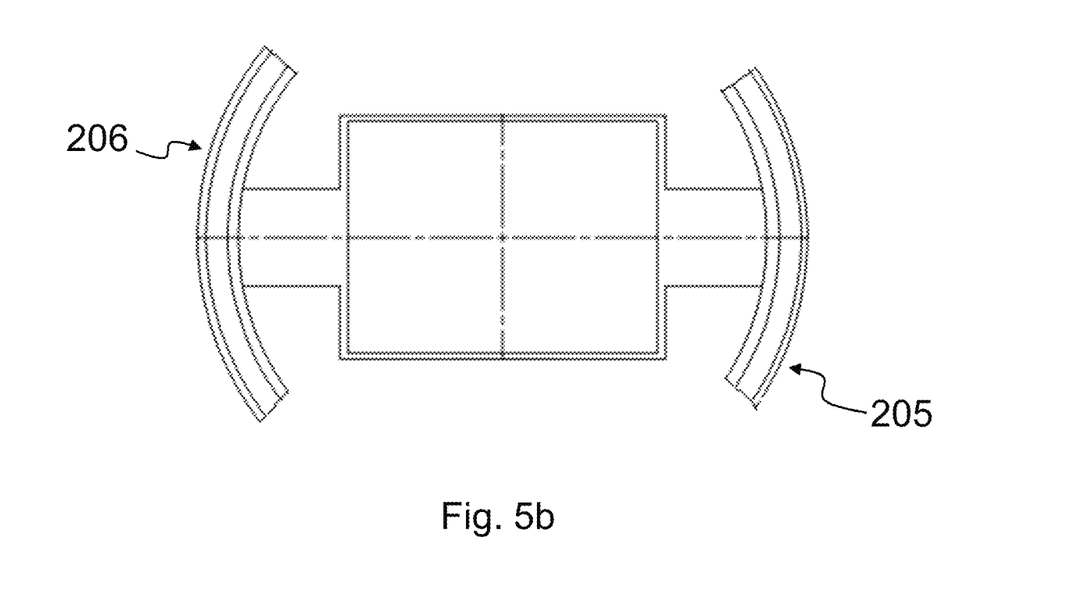

Finally, FIGS. 5a and 5b illustrate two further embodiments of the system of the present invention, in particular of the circular crown 20 forming the grip of the steering wheel of the system of the present invention.

The embodiments illustrated in FIGS. 5a and 5b can include all the technical features described above, alternatively or in combination and, with respect to the previous figures, differ exclusively by the shape of the circular crown 20.

According to the embodiment of FIG. 5a, the circular crown does not extend over the entire circumference of the steering wheel, but is limited to a circular arc 203.

It is evident that the "discontinuity" zone 204 of the circular crown, can be included in any area of the circular crown, even if in FIG. 5a the circular arc 203 is envisaged higher with respect to the display unit 23.

It follows that the steering wheel consists exclusively of the circular arc 203 emerging from the dashboard 22 and fixed to the latter.

FIG. 5b also illustrates "discontinuity" zones of the circular crown, which consists of two circular sectors 205 and 206, arranged, respectively, to the right and left of the steering wheel hub.

Regardless of the configuration of FIG. 5a or 5b, the system object of the present invention allows, for example through the configuration of the processing unit 32, to reduce/convert the movement of the hands on the parts 203, 204, 205 and 206, so that the extension of said parts corresponds to the entire movement stroke of the steering cylinders which control the outboard motors 30.

While the invention is susceptible to various modifications and alternative constructions, some preferred embodiments have been shown in the drawings and disclosed in detail.

It should be understood, however, that there is no intention to limit the invention to the specific illustrated embodiment but, on the contrary, the aim is to cover all the modifications, alternative constructions and equivalents falling within the scope of the invention as defined in the claims.

The use of "for example", "etc." or "or" refers to non-exclusive non-limiting alternatives, unless otherwise stated.

The use of "includes" means "includes but is not limited to", unless otherwise stated.

The invention claimed is:

1. A vehicle steering system, comprising:
   a control steering wheel;
   a transmission system; and
   a steering actuator,
   wherein the control steering wheel is configured to generate steering signals, transmitted to the steering actuator through the transmission system,
   wherein the control steering wheel is fixedly mounted and comprises a sensor system configured to detect a position of one or both hands of a user on a grip of the control steering wheel,
   wherein the steering signals being are generated based on a variation of the position of the one or both hands along the grip of the steering wheel, and
   wherein said sensor system comprises a guide arranged along at least part of a length of the grip of the steering wheel, the guide cooperating with at least one slider, further comprising an identification system of a movement of the at least one slider.

2. The vehicle steering system according to claim 1, wherein said sensor system comprises one or more capacitive sensors disposed on the steering wheel, the one or more capacitive sensors being arranged along at least part of a length of the grip of the steering wheel.

3. The vehicle steering system according to claim 2, wherein the one or more capacitive sensors are disposed in a front and/or peripheral part of the grip of the steering wheel, facing the user.

4. The vehicle steering system according to claim 1, wherein the guide is disposed in a front part of the grip of the steering wheel, facing the user.

5. The vehicle steering system according to claim 1, wherein the slider supports a covering element of at least part of the guide, the covering element being mounted integral with the at least one slider and having a relative movement in relation to the control steering wheel.

6. The vehicle steering system according to claim 1, wherein the identification system of the movement of the at least one slider comprises an optical system.

7. The vehicle steering system according to claim 1, further comprising a display unit configured to visualize at least running conditions of the vehicle.

8. The vehicle steering system according to claim 7, wherein the display unit is disposed at a center of the steering wheel.

9. The vehicle steering system according to claim 1, further comprising a processor configured to set, in response to a corresponding movement value of one or both of the user's hands, a corresponding movement value of the steering actuator.

10. The vehicle steering system according to claim 1, further comprising a sensor adapted to identify a movement of the steering actuator.

\* \* \* \* \*